United States Patent
Kinomura et al.

(10) Patent No.: US 8,900,384 B2
(45) Date of Patent: Dec. 2, 2014

(54) METHOD FOR HEAT-TREATING METAL TUBES OR PIPES FOR NUCLEAR POWER PLANT

(75) Inventors: Shoji Kinomura, Takarazuka (JP); Shinichi Takenaka, Takarazuka (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 147 days.

(21) Appl. No.: 13/555,270

(22) Filed: Jul. 23, 2012

(65) Prior Publication Data

US 2012/0285577 A1 Nov. 15, 2012

Related U.S. Application Data

(63) Continuation of application No. PCT/JP2011/000384, filed on Jan. 25, 2011.

(30) Foreign Application Priority Data

Jan. 28, 2010 (JP) ................................. 2010-017063

(51) Int. Cl.
 *C21D 9/08* (2006.01)
 *C22F 1/02* (2006.01)
 (Continued)

(52) U.S. Cl.
 CPC ................ *C22C 38/40* (2013.01); *C22C 27/06* (2013.01); *C22F 1/10* (2013.01); *C22C 19/058* (2013.01); *C22F 1/18* (2013.01); *C22F 1/02* (2013.01); *C21D 6/004* (2013.01); *G21C 17/017* (2013.01); *F16L 9/02* (2013.01); *C21D 9/08* (2013.01); *C22C 19/05* (2013.01); *G21C 21/00* (2013.01); *C21D 9/0018* (2013.01); *Y10S 376/90* (2013.01)
 USPC ........... 148/592; 148/591; 148/590; 148/594; 432/253; 432/251; 432/9; 432/10; 432/11; 432/12; 376/900

(58) Field of Classification Search
 USPC .......................... 148/312, 325–327, 590–594; 266/249–265, 274–279, 280–287; 432/9–12, 253; 138/177; 376/900
 See application file for complete search history.

(56) References Cited

U.S. PATENT DOCUMENTS

| 4,168,994 | A | * | 9/1979 | Owens | 148/592 |
| 4,798,633 | A | * | 1/1989 | Martin et al. | 148/675 |
| 2009/0277543 | A1 | * | 11/2009 | Omodeo Sale' | 148/592 |

FOREIGN PATENT DOCUMENTS

| JP | 05-085840 | 11/1993 |
| JP | 07-6697 | 1/1995 |

(Continued)

OTHER PUBLICATIONS

Sam Kiser, "Inconel Alloys" China Academic Journal Electronic Publishing House, 2005.

*Primary Examiner* — Deborah Yee
(74) *Attorney, Agent, or Firm* — Clark & Brody

(57) ABSTRACT

In a method for heat treating a metal tube or pipe for a nuclear power plant, the tube or pipe being accommodated in a batch-type vacuum heat treatment furnace, when the tube or pipe is laid down on and is subjected to heat treatment on a plurality of metal cross beams arranged along a longitudinal direction of the tube or pipe, it is possible to suppress scratches to be formed on the outer surface of the tube or pipe and attributable to heat treatment, and to reduce the discoloration on the outer surface of the tube or pipe by holding the tube or pipe and the metal cross beams in indirect contact with each other by virtue of a heat resistant fabric having a thickness of 0.1 to 1.2 mm interposed in between.

2 Claims, 1 Drawing Sheet

(51) Int. Cl.
*G21C 21/00* (2006.01)
*F27D 3/00* (2006.01)
*C22C 27/06* (2006.01)
*C22F 1/10* (2006.01)
*C22C 38/40* (2006.01)
*C22C 19/05* (2006.01)
*C22F 1/18* (2006.01)
*C21D 6/00* (2006.01)
*G21C 17/017* (2006.01)
*F16L 9/02* (2006.01)
*C21D 9/00* (2006.01)

(56) References Cited

FOREIGN PATENT DOCUMENTS

| | | |
|---|---|---|
| JP | 2001-335844 | 12/2001 |
| JP | 2003-247023 | 9/2003 |

\* cited by examiner

METHOD FOR HEAT-TREATING METAL TUBES OR PIPES FOR NUCLEAR POWER PLANT

TECHNICAL FIELD

The present invention relates to a method for heat-treating a metal tube or pipe for a nuclear power plant, which can suppress the occurrence of scratches and discoloration, a batch-type vacuum heat treatment furnace used therefor, and a metal tube or pipe for a nuclear power plant heat-treated by the same.

It is noted that the definition of a term in the present description is, unless otherwise stated, as follows.

A "metal tube or pipe for a nuclear power plant" refers to a metal tube or pipe which is made of a Ni-based alloy excellent in intergranular corrosion resistance in a high-temperature water environment, and is used as a heat-transfer tube of a steam generator adopted in a nuclear power plant.

BACKGROUND ART

In the production of a metal tube or pipe for a nuclear power plant (hereafter, also referred to as simply a "metal tube or pipe"), in general, after being processed into a metal tube or pipe of predetermined dimensions, the metal tube or pipe is subjected to solid solution heat treatment, and is further subjected to precipitation heat treatment to cause carbides to precipitate along grain boundaries for further improving corrosion resistance, thereby being finished. The precipitation heat treatment is performed with heating to about 700 degrees centigrade and is intended for improving the intergranular corrosion resistance of the metal tube or pipe by causing Cr carbides to precipitate along grain boundaries. The precipitation heat treatment is also intended for removing the residual stress of the metal tube or pipe, which is caused by crookedness straightening and grinding processing to be performed after the solid solution heat treatment.

Since occurrence of discoloration due to the formation of an oxide film on the surface (outer surface or inner surface) of metal tube or pipe in the precipitation heat treatment may lead to corrosion when used as the product, the precipitation heat treatment is generally performed with a vacuum furnace. Since the heat treatment by use of a vacuum furnace is performed by heating the metal tube or pipe held in the furnace in vacuum, radiation heating is often utilized as the heating method. Moreover, the precipitation heat treatment is performed by a batch type treatment in which a plurality of metal tubes or pipes being laid down on a cart or a tray etc. are accommodated in a vacuum furnace and subjected to heat treatment.

FIGS. 1A and 1B are diagrams showing a cart which is used in a batch-type vacuum heat treatment furnace, and on which a metal tube or pipe for a nuclear power plant is laid down, where FIG. 1A is a front view and FIG. 1B is a side view. The cart 2 shown in FIGS. 1A and 1B comprises a carriage 21 with wheels, support pillars 23 fixed to the carriage, and metal cross beams 22 each bridged between two support pillars 23. When the metal tubes or pipes are subjected to precipitation heat treatment with a batch-type vacuum heat treatment furnace by using the cart shown in FIGS. 1A and 1B, the cart is accommodated in the batch-type vacuum heat treatment furnace with a plurality of metal tubes or pipes 1 being laid down on the metal cross beams 22, and the metal tubes or pipes are heated.

A metal tube or pipe for a nuclear power plant has a longer length, since it generally has a diameter of 15 to 22 mm, a wall thickness of 0.9 to 1.3 mm, and a length of 15000 to 27000 mm. Therefore, to prevent the metal tube or pipe from flexing when it is set in place, and from deforming during heat treatment, a plurality of metal cross beams 22 are disposed along a longitudinal direction of the metal tube or pipe in the cart 2, and the cart 2 is assembled by connecting a plurality of carriages 21.

In the precipitation heat treatment, a metal tube or pipe is heated to an elevated temperature to thereby incur thermal expansion in an axial direction of the tube or pipe. On that occasion, the cart or the tray used for laying down the metal tube or pipe also thermally expand, while they have different thermal expansion coefficients from that of the metal tube or pipe. Accordingly, the metal tube or pipe with a longer length inevitably exhibits a large deformation, so the metal tube or pipe and the lay-down portions of the cart or the tray are subjected to rub against each other and thereby scratches are formed on the outer surface of the metal tube or pipe.

The scratches thus formed are made up of a concave portion where the outer surface of the metal tube or pipe is scraped by being rubbed against the lay-down portions, and a convex portion where the scraped metal being a lump and adhered to the outer surface. The concave portion of a scratch may become an initiation of corrosion of the metal tube or pipe, leading to a serious accident in a nuclear power plant. Therefore, the concave portion of a scratch is required to meet the requirement of depth and length limits, compared with those of the standard limit sample, and if the depth or the length of the scratch is more than that of the standard limit sample, it is necessary to polish the outer surface of the metal tube or pipe to take off the concave portion thereof. If such polishing is performed by a machining process, residual stress, which has been once removed from the metal tube or pipe by the precipitation heat treatment, is reproduced, and therefore the polishing is inevitably carried out by hand work.

Further, the convex portion of a scratch may damage a fixture of a steam generator when fixing a metal tube or pipe to the steam generator of a nuclear power plant, thereby leading to a serious accident in the nuclear power plant. For that reason, the convex portion of a scratch should be polished by hand work and be removed as in the case of a concave portion.

Therefore, in the production of a metal tube or pipe, an inspection is made for the presence or absence of a scratch after heat treatment for controlling scratches, and when the scratch is found, the outer surface of the metal tube or pipe is polished by hand work to remove the convex portion thereof. Moreover, when the depth or length of the scratch is more than that of the standard limit sample, the convex portion thereof will be removed by polishing, and therefore the production efficiency deteriorates.

A study has been made to suppress the occurrence of scratches by disposing, without restriction, a thin sheet-like, metallic support member on the metal cross beams 22 of the cart shown in FIGS. 1A and 1B described above so that the support member freely moves in a longitudinal direction of the metal tube or pipe as the metal tube or pipe 1 expands during heat treatment. Furthermore, a study also has been made to prevent the occurrence of scratches by increasing the contact area between the metal tube or pipe and the support member so that the pressure acting on the surface of the contact portion decreases. However, it turned out that those countermeasures are insufficient, and scratches having a depth of about 10 μm are still formed on the outer surface of the metal tube or pipe by precipitation heat treatment.

In the cart shown in FIGS. 1A and 1B described above, under the condition that a heat resistant fabric is disposed on the metal cross beam so that the metal tube or pipe and the metal cross beam are held in indirect contact with each other by virtue of the heat resistant fabric interposed in between, the metal tube or pipe is subjected to precipitation heat treatment in a batch-type vacuum heat treatment furnace. In this way, it is possible to suppress the formation of scratches on the outer surface of the metal tube or pipe. In this case, however, an oxide film may be formed on the outer surface of the metal tube or pipe thereby causing discoloration in the portion where the metal tube or pipe and the metal beam are in indirect contact. If the outer surface of the metal tube or pipe is discolored, corrosion resistance may deteriorate leading to corrosion of the metal tube or pipe. For this reason, it is necessary to remove the discoloration (oxide film) by polishing the outer surface of the metal tube or pipe by hand work.

Up to now, various proposals have been made to suppress the scratches caused by heat treatment and, for example, Patent Literature 1 proposes a heat treatment method using a heat resistant fabric. In Patent Literature 1, it is stated that the formation of scratches on the outer surface of a bar material is suppressed by winding a heat resistant fabric around the outer peripheral surface of a heat treating roller for heating the bar material to be heat treated in a continuous heat treatment in inert gas or reducing gas atmosphere.

Further, Patent Literature 2 relates to a continuous heat treatment method in which a copper tube wound into a coil is laid down on a conveyor to pass through a heating furnace. In Patent Literature 2, when a plurality of copper tubes bundled by a metal band are laid down on a conveyor, a laminated body which is composed of plural stacked sheets of heat resistant fabric and is bound by a heat resistant string or adhesive is used as a cushioning material. It is described that this can suppress the formation of scratches on the surface of the copper tube when it is laid down on the conveyor, and also suppress the metal band from digging into the copper tube at the time of heat treatment.

The heat treatment methods proposed by Patent Literatures 1 and 2 relate to a continuous heat treatment furnace, and are not intended for a vacuum furnace which is used for preventing the discoloration on the surface of materials to be heat treated. Thus, although studies have been made on the scratches caused by heat treatment, no study has been made on the discoloration caused by heat treatment.

CITATION LIST

Patent Literature

Patent Literature 1: Japanese Patent Application Publication No. 2001-335844
Patent Literature 2: Japanese Utility Model Laid-Open No. 5-85840

SUMMARY OF INVENTION

Technical Problem

As so far described, in precipitation heat treatment of a metal tube or pipe for a nuclear power plant in a batch-type vacuum heat treatment furnace, the problem is that scratches on the outer surface of the metal tube or pipe are formed as the result of the metal tube or pipe undergoing thermal expansion and thereby being rubbed against metal cross beams on which the metal tube or pipe itself is laid down. Further, although scratches can be suppressed when the metal tube or pipe and the metal beam are held in indirect contact with each other by virtue of a heat resistant fabric interposed in between, another problem is that the outer surface of the metal tube or pipe is discolored due to heat treatment.

The present invention has been made in view of such circumstances, and has its object to provide a method for heat treating a metal tube or pipe for a nuclear power plant, which enables the suppression of not only scratches but also discoloration attributable to heat treatment.

Solution to Problem

In order to solve the above described problems, the present inventors have investigated the cause by which the outer surface of a metal tube or pipe is discolored when the metal tube or pipe is subjected to precipitation heat treatment in a batch-type vacuum heat treatment furnace under the condition that a heat resistant fabric is laid down on metal cross beams so that the metal tube or pipe and the metal beams are held in indirect contact with each other by virtue of the heat resistant fabric interposed in between. As a result of that, it has been found that a very small quantity of moisture mingled in the fibers of the heat resistant fabric still remains in the heat resistant fabric without being removed by a vacuum evacuation process performed before heating, and is vaporized during heating to yield gas, which reacts with the outer surface of the metal tube or pipe, resulting in discoloration. Further, it has been found that discoloration on the outer surface of the metal tube or pipe is more liable to occur, unless the moisture vaporized from the heat resistant fabric is sufficiently removed from the interior of the furnace in a state under which the temperature inside the furnace is more than 300° C.

The present inventors have conducted diligent studies by performing various tests based on the investigation results described above and consequently have found that bringing the metal tube or pipe and the metal beam into indirect contact with each other with a heat resistant fabric having a thickness of 0.1 to 1.2 mm interposed in between enables the scratches to be suppressed while enabling the discoloration by heat treatment to be reduced.

The present invention has been completed based on the findings described above, and its summaries are the following methods (1) and (2) for heat treating metal tubes or pipes for nuclear power plant, the following batch-type vacuum heat treatment furnace (3), and the following metal tube or pipe for nuclear power plant (4):

(1) A method for heat treating a metal tube or pipe for a nuclear power plant while the metal tube or pipe being accommodated in a batch-type vacuum heat treatment furnace, wherein when the metal tube or pipe for a nuclear power plant, is laid down on and subjected to heat treatment on a plurality of metal cross beams arranged along a longitudinal direction of the metal tube or pipe, the metal tube or pipe and the metal cross beams are held in indirect contact with each other by virtue of a heat resistant fabric having a thickness of 0.1 to 1.2 mm interposed in between.

(2) The method for heat treating a metal tube or pipe for a nuclear power plant according to the above-described (1), wherein the metal tube or pipe for a nuclear power plant has a composition consisting of in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(3) A batch-type vacuum heat treatment furnace for heat treatment, the furnace accommodating a metal tube or pipe for a nuclear power plant that is laid down on a plurality of metal cross beams arranged along a longitudinal direction of the metal tube or pipe, wherein a heat resistant fabric having a thickness of 0.1 to 1.2 mm is disposed on the metal cross beams so that the metal tube or pipe and the metal cross beams are brought into indirect contact with each other by virtue of the heat resistant fabric interposed in between.

(4) A metal tube or pipe for a nuclear power plant, wherein the metal tube or pipe is heat-treated by using the method for heat treating the metal tube or pipe for a nuclear power plant according to the above-described (1) or (2), and thus is free of scratches and discoloration attributable to the heat treatment.

Advantageous Effects of Invention

The method for heat treating a metal tube or pipe for a nuclear power plant of the present invention has the following remarkable effects.

(1) By bringing the metal tube or pipe and the metal beam into indirect contact with each other by virtue of a heat resistant fabric interposed in between, it is possible to suppress the formation of scratches on the outer surface of the metal tube or pipe.

(2) By using a heat resistant fabric having a thickness of 0.1 to 1.2 mm, it is possible to reduce the discoloration on the outer surface of the metal tube or pipe.

(3) It is possible to obtain a metal tube or pipe that has no scratch and discoloration caused by heat treatment, and in this case, there is no need of grinding the outer surface of the metal tube or pipe by hand work to remove scratches and discoloration so that the production efficiency of the metal tube or pipe can be improved.

In the batch-type vacuum heat treatment furnace of the present invention, a heat resistant fabric having a thickness of 0.1 to 1.2 mm disposed on the metal cross beams can facilitate the method for heat treating a metal tube or pipe for a nuclear power plant of the present invention.

The metal tube or pipe for nuclear power plant of the present invention has an excellent corrosion resistance because it is heat treated by using the method for heat treating a metal tube or pipe for a nuclear power plant of the present invention so that the tube or pipe is free of scratches and discoloration attributable to the heat treatment.

BRIEF DESCRIPTION OF DRAWINGS

FIG. 1A is a front view and FIG. 1B is a side view.

DESCRIPTION OF EMBODIMENTS

Figure 1A:
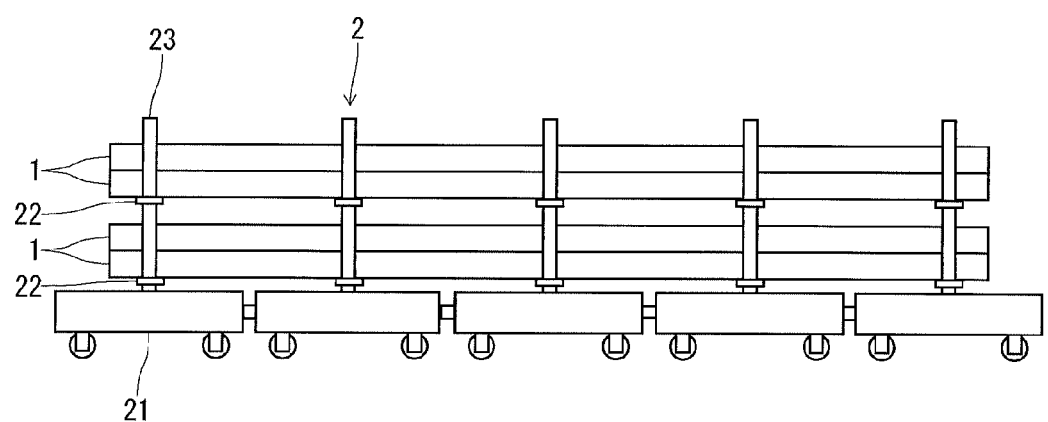
FIGS. 1A and 1B are diagrams to show a cart on which a metal tube or pipe for nuclear power plant is laid down, and which is included in a batch-type vacuum heat treatment furnace, where

Hereafter, a method for heat treating a metal tube or pipe for a nuclear power plant of the present invention, a batch-type vacuum heat treatment furnace used therefor, and a metal tube or pipe for nuclear power plant which is processed by the same will be described.

[Method for Heat Treating Metal Tube or Pipe for Nuclear Power Plant]

A method for heat treating a metal tube or pipe for a nuclear power plant of the present invention is arranged such that when performing heat treatment for a metal tube or pipe for use in a nuclear power plant which is accommodated in the batch-type vacuum heat treatment furnace as being laid down on a plurality of metal cross beams arranged along a longitudinal direction of the metal tube or pipe, the metal tube or pipe and the metal beams are held in indirect contact with each other by virtue of a heat resistant fabric having a thickness of 0.1 to 1.2 mm interposed in between.

Since holding the metal tube or pipe and the metal beams in indirect contact with each other by virtue of a heat resistant fabric interposed in between allows the heat resistant fabric to function as a buffer material, it is possible to suppress the formation of scratches on the metal tube or pipe when the metal tube or pipe thermally expands in heat treatment. Further, the thickness of the heat resistant fabric of 0.1 to 1.2 mm will contribute to a decrease in the amount of moisture remaining between fibers of the heat resistant fabric after a vacuum evacuation process. As a result, during heat treatment, it is possible to vaporize the moisture remaining in the heat resistant fabric and remove the majority thereof in a temperature range of 100 to 300° C., before the temperature inside the furnace reaches 300° C., at which discoloration is liable to occur. Therefore, it is possible to reduce discoloration which occurs due to the reaction of gas with the outer surface of the metal tube or pipe where the gas is generated when the moisture remaining in the heat resistant fabric is vaporized by heat.

If the thickness of the heat resistant fabric is more than 1.2 mm, the amount of moisture remaining in the heat resistant fabric after the vacuum evacuation may increase, and therefore the removal of moisture by the vaporization in the temperature range of 100 to 300° C. may be incomplete during heat treatment. Thus, after the temperature inside the furnace rises above 300° C., the moisture remaining in the heat resistant fabric is vaporized, and the discoloration on the outer surface of the metal tube or pipe becomes significantly noticeable. On the other hand, if the thickness of the heat resistant fabric is less than 0.1 mm, the heat resistant fabric will wear out due to the contact with the metal tube or pipe, thus requiring frequent exchanges of the heat resistant fabric. Therefore, the thickness of the heat resistant fabric has been determined to be 0.1 to 1.2 mm. A preferable lower limit is 0.2 mm, and a preferable upper limit is 1.0 mm. A more preferable upper limit is 0.6 mm.

As the heat resistant fabric, it is necessary to use the one which will not generate carbon and organic matter, which may affect the quality of the metal tube or pipe, when heated to an elevated temperature in heat treatment. To be specific, a woven fabric in which long fibers of silica fiber and ceramic fiber are woven, or a non-woven fabric using those long fibers may be used.

In the method for heat treating a metal tube or pipe for a nuclear power plant of the present invention, it is preferable that when laying down the metal tube or pipe on the metal cross beams, another metal tube or pipe is further stacked on the layer of the metal tube or pipe which has been first laid down. Since a metal tube or pipe which is stacked on the metal tube or pipe having the same thermal expansion coefficient will not undergo rubbing during heat treatment, no scratch will be formed on the outer surface of either of the metal tube or pipe.

Moreover, as described above, discoloration occurs as the result of the formation of an oxide film due to the reaction of the gas, which is produced by the vaporization of moisture of the heat resistance fabric, with the outer surface of the metal tube or pipe. Since this gas diffuses in the surrounding of the layer of the metal tubes or pipes laid down on the metal cross beams, without spreading to the metal tubes or pipes stacked on the layer of the metal tubes or pipes, discoloration will not occur in the metal tubes or pipes stacked on the layer of the metal tubes or pipes. Therefore, it is possible to obtain a metal tube or pipe that is free of scratches and discoloration attributable to heat treatment.

In the method for heat treating a metal tube or pipe for a nuclear power plant of the present invention, it is preferable that time required for heating over a temperature range of 100 to 300° C. is not less than 30 minutes in case of heating a metal tube or pipe for a nuclear power plant. Since heating over a temperature range of 100 to 300° C. in not less than 30 minutes allows the removal of moisture remaining in the heat resistant fabric without discoloring the metal tube or pipe, it is possible to further reduce discoloration on the outer surface of the metal tube or pipe.

When heating a metal tube or pipe for a nuclear power plant, to prevent the longer-length metal tube or pipe from being locally heated, generally, the longer-length metal tube or pipe can be uniformly heated to and held at a heat treatment temperature after preliminary soaking that is carried out by maintaining the interior of the furnace at a predetermined temperature. Therefore, in the method for heat treating a metal tube or pipe for a nuclear power plant, it is preferable to set the soaking temperature in the range of 100 to 300° C., and to heat the metal tube or pipe while the metal tube or pipe being retained in a temperature range of 100 to 300° C. for not less than 30 minutes. This is because this will make it possible to uniformly heat the metal tube or pipe, and reduce discoloration of the metal tube or pipe.

[Composition of Metal Tube or Pipe for Nuclear Power Plant]

In the method for heat treating a metal tube or pipe for a nuclear power plant of the present invention, as for the composition of the metal tube or pipe, it is preferable to use an alloy consisting of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

It is noted that the impurities refer to elements which are inevitably mixed from metal ores, scraps, and the like, and are permitted within a range that will not give adverse effects on the present invention.

The reasons why each element is limited are as follows. It is noted that in the description below, "%" relating to the content refers to "mass %".

C: 0.15% or Less

If C is contained by more than 0.15%, stress corrosion cracking resistance may degrade. Therefore, when C is contained, its content is preferably 0.15% or less, and more preferably 0.06% or less. It is noted that C has an effect of increasing the grain boundary strength of an alloy. To achieve this effect, it is preferable that the content of C is 0.01% or more.

Si: 1.00% or Less

Si is used as a deoxidizer at the time of refining, and remains as an impurity in an alloy. In this occasion, it is preferable to limit the content of Si to be 1.00% or less. If its content is more than 0.50%, the cleanliness of the alloy may deteriorate, and therefore the content of Si is more preferably limited to 0.50% or less.

Mn: 2.0% or Less

Mn is an effective element for immobilizing S that is an impurity element, as MnS thereby improving hot workability, and is effective as an oxidizer. If its content is more than 2.0%, Mn will deteriorate the cleanliness of the alloy, and therefore its content is preferably 2.0% or less. More preferably, its content is 1.0% or less. Moreover, when an improving effect of hot workability by MnS is desired, the content of Mn is preferably 0.1% or more.

P: 0.030% or Less

P is an element that is present in an alloy as an impurity, if its content is more than 0.030%, it may have an adverse effect on corrosion resistance. Therefore, the content of P is preferably limited to 0.030% or less.

S: 0.030% or Less

S is an element that is present in an alloy as an impurity, and if its content is more than 0.030%, it may have an adverse effect on corrosion resistance. Therefore, the content of S is preferably limited to 0.030% or less.

Cr: 10.0 to 40.0%

Cr is an element necessary for maintaining corrosion resistance of an alloy, and is preferably contained in amount of 10.0% or more. However, if its content is more than 40.0%, this means that the content of Ni relatively decreases, causing a risk that corrosion resistance and hot workability of the alloy deteriorate. Therefore, the content of Cr is preferably 10.0 to 40.0%. To be specific, when Cr is contained in amount of 14.0 to 17.0%, it is excellent in corrosion resistance in an environment containing chlorides, and when Cr is contained in amount of 27.0 to 31.0%, it additionally exhibits much excellent corrosion resistance in pure water and an alkali environment at high temperatures.

Ni: 8.0 to 80.0%

Ni is an element necessary for maintaining corrosion resistance of an alloy, and is preferably contained in an amount of 8.0% or more. On the other hand, since Ni is expensive, it may be contained in a minimum acceptable amount depending on its uses, and its content is preferably 80.0% or less.

Ti: 0.5% or Less

Ti may degrade the cleanliness of an alloy if its content is more than 0.5%, and therefore its content is preferably 0.5% or less, and more preferably 0.4% or less. However, in view of the improvement of workability of the alloy and the suppression of the grain growth at the time of welding, Ti is preferably contained in an amount of 0.1% or more.

Cu: 0.6% or Less

Cu is an element that is present as an impurity in an alloy, and if its content is more than 0.6%, the corrosion resistance of the alloy may deteriorate. Therefore, the content of Cu is preferably limited to 0.6% or less.

Al: 0.5% or Less

Al is used as an oxidizer at the time of refining, and remains in an alloy as, an impurity. The remaining Al becomes an oxide-based inclusion in the alloy and thereby degrades the cleanliness of the alloy so that the corrosion resistance and mechanical properties of the alloy may be adversely affected. Therefore, the content of Al is preferably limited to 0.5% or less.

N: 0.20% or Less

Although N may not be added, N is normally contained in an amount of about 0.01% as an impurity in an alloy which is within the scope of the present invention. However, active addition of N can improve strength without degrading corrosion resistance. That said, if it is contained in an amount exceeding 0.20%, corrosion resistance will deteriorate, and therefore, when it is contained, its upper limit is preferably 0.20%.

Among above-described compositions for a metal tube or pipe for a nuclear power plant, particularly, a Ni-based alloy tube or pipe of a composition consisting of C: 0.15% or less, Si: 1.00% or less, Mn: 2.0% or less, P: 0.030% or less, S: 0.030% or less, Cr: 10.0 to 40.0%, Fe: 15.0% or less, Ti: 0.5% or less, Cu: 0.6% or less, and Al: 0.5% or less, the balance being Ni and impurities is excellent in corrosion resistance, and therefore is preferable.

A typical Ni-based alloy consisting of the above-described composition and is suitable for use in a metal tube or pipe includes the following two grades.

(a) A Ni-based alloy consisting of C: 0.15% or less, Si: 1.00% or less, Mn: 2.0% or less, P: 0.030% or less, S: 0.030% or less, Cr: 14.0 to 17.0%, Fe: 6.0% to 10.0%, Ti: 0.5% or less, Cu: 0.6% or less, and Al: 0.5% or less, the balance being Ni and impurities.

(b) A Ni-based alloy consisting of C: 0.06% or less, Si: 1.00% or less, Mn: 2.0% or less, P: 0.030% or less, S: 0.030% or less, Cr: 27.0 to 31.0%, Fe: 7.0% to 11.0%, Ti: 0.5% or less, Cu: 0.6% or less, and Al: 0.5% or less, the balance being Ni and impurities.

Since the alloy of above-described (a) contains 14.0 to 17.0% of Cr and about 75% of Ni, it is an alloy excellent in corrosion resistance in an environment containing chlorides. In this alloy, in view of the balance between the Ni content and Cr content, the content of Fe is preferably 6.0 to 10.0%.

Since the alloy of above-described (b) contains 27.0 to 31.0% of Cr and about 60% of Ni, it is an alloy excellent in corrosion resistance in pure water and an alkali environment at high temperatures, as well as in an environment containing chlorides. In this alloy as well, in view of the balance between the Ni content and the Cr content, the content of Fe is preferably 7.0 to 11.0%.

[Batch-Type Vacuum Heat Treatment Furnace]

The batch-type vacuum heat treatment furnace of the present invention is a batch-type vacuum heat treatment furnace for heat treatment, the furnace accommodating a metal tube or pipe for a nuclear power plant being laid down on a plurality of metal cross beams arranged along a longitudinal direction of metal tube or pipe, wherein a heat resistant fabric having a thickness of 0.1 to 1.2 mm is disposed on the metal cross beams so that the metal tube or pipe and the metal beams are brought into indirect contact with each other by virtue of the heat resistant fabric interposed in between.

The batch-type vacuum heat treatment furnace of the present invention can be configured by adopting, for example, a cart as shown in FIG. 1 described above, and disposing a heat resistant fabric having a thickness of 0.1 to 1.2 mm on the metal cross beams thereof, for accommodating metal tubes or pipes to be supported on a plurality of metal cross beams that are arranged along a longitudinal direction of metal tubes or pipes. Since disposing a heat resistant fabric having a thickness of 0.1 to 1.2 mm on the metal cross beams allows the metal tubes or pipes to be laid down thereon always in indirect contact with the metal cross beams by virtue of the heat resistant fabric interposed in between, it is possible to easily perform the method for heat treating metal tubes or pipes for a nuclear power plant of the present invention.

The disposition of the heat resistant fabric for the metal cross beams can adopt various modes provided that the metal tubes or pipes to be laid down and the metal cross beams are brought into indirect contact with each other by virtue of the heat resistant fabric interposed in between. For example, the disposition may be such that the entire upper surfaces (the surfaces on which metal tubes or pipes are laid down) of the metal cross beams are covered with the heat resistant fabric. And, the heat resistant fabric may be in a cylindrical form, and each of metal cross beams is inserted thereinto, thus disposing the heat resistant fabric on the metal beams. When the metal cross beam is inserted into the cylindrical heat resistant fabric, the heat resistant fabric can be fixed on the metal beam, which is preferable since it is possible to prevent the heat resistant fabric from coming off when the metal tubes or pipes are laid down.

[Metal Tube or Pipe for Nuclear Power Plant]

The metal tube or pipe for nuclear power plant of the present invention is heat treated by using the method for heat treating a metal tube or pipe for a nuclear power plant of the present invention described above so that the tube or pipe is free of scratches and discoloration attributable to the concerned heat treatment.

By using the method for heat treating a metal tube or pipe for a nuclear power plant of the present invention in order to suppress scratches and to reduce discoloration, the scratches and the discoloration being attributable to heat treatment, it is possible to obtain a metal tube or pipe that is free of scratches and discoloration attributable to the concerned heat treatment. This metal tube or pipe is excellent in corrosion resistance and is suitable for a heat transfer tube of a steam generator.

[Example]

A test for obtaining a metal tube or pipe by subjecting it to precipitation heat treatment by using the method for heat treating a metal tube or pipe for a nuclear power plant of the present invention and the batch-type vacuum heat treatment furnace used therefor was performed to verify advantageous effects of the present invention.

[Test Method]

Figure 1B:
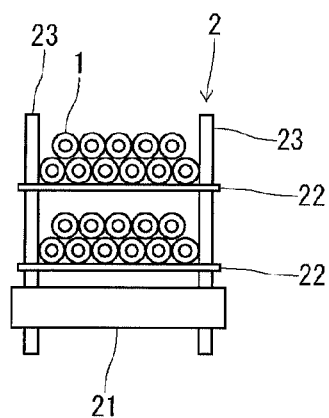

In the cart shown in FIGS. 1A and 1B described above, a heat resistant fabric was disposed on the surface of metal cross beams so that a metal tube or pipe and metal cross beams were set in indirect contact with each other by virtue of the heat resistant fabric interposed in between, and after the cart was accommodated in a batch-type vacuum heat treatment furnace, the interior of the furnace, which was evacuated in vacuum, was heated to perform heat treatment of the tube or pipe, thereby obtaining the intended metal tube or pipe. The conditions thereof were as follows.

Tube: outer diameter 19.05 mm, wall thickness 1.09 mm, length 20,000 mm

Material: ASME SB-163 UNS N06690 Ni-based alloy (Nominal composition: 30 mass % Cr-60 mass % Ni-10 mass % Fe)

In Inventive Example 1 of the present invention, a woven fabric made up of ceramic fiber predominantly composed of aluminum silicate ($Al_2O_5Si$), and having a thickness of 0.35 mm was used as the heat resistant fabric. For Inventive Example 2, Inventive Example 3 and Comparative Example 1, a woven fabric made up of silica ($SiO_2$) fibers was used, and its thickness was 0.6 mm for Inventive Example 2, 1.2 mm for Inventive Example 3, and 1.5 mm for Comparative Example 1. In Comparative Example 2, a tube or pipe and metal cross beams were in indirect contact with each other by interposing a support member made of SUS304 without using a heat resistant fabric.

The precipitation heat treatment was conducted such that heating from the room temperature to a heat treatment temperature of 700° C. was performed in 12 hours, thereafter the heat treatment temperature was held for 10 hours, and thereafter cooling to the room temperature was performed in 10 hours. When performing the heating from the room temperature to the heat treatment temperature, heating from 100° C. to 300° C. was performed in one hour.

[Evaluation Index]

For Inventive Examples and Comparative Examples, metal tubes or pipes thus obtained were observed by visual inspection to confirm the presence or absence of scratches and discoloration. Further, regarding discoloration, the extended area of discoloration as well as the presence or absence thereof was evaluated.

The meanings of the symbols in the "Evaluation of discoloration" column in Table 1 are as follows.

◯: indicates that no discoloration was recognized on the outer surface of the metal tube or pipe.

Δ: indicates that discoloration was recognized on the outer surface of the metal tube or pipe and the extended area was not more than the half of the circumference of metal tube or pipe.

x: indicates that discoloration was recognized on the outer surface of the metal tube or pipe and the extended area of discoloration was more than the half of the circumference.

Regarding Inventive Example 1 and Comparative Example 2, microscopic observation was performed on a longitudinal section of the obtained metal tubes or pipes to investigate the quality of the metal tubes or pipes. Table 1 shows the thickness (mm) of the used heat resistant fabric, the presence or absence of scratches in the obtained metal tubes or pipes, and the evaluation of discoloration.

TABLE 1

| Category | Thickness of heat resistant fabric (mm) | Presence or absence of scratches | Evaluation of discoloration |
|---|---|---|---|
| Inventive Example 1 | 0.35 | Absent | ○ |
| Inventive Example 2 | 0.60 | Absent | Δ |
| Inventive Example 3 | 1.20 | Absent | Δ |
| Comparative Example 1 | 1.50 | Absent | X |
| Comparative Example 2 | — | Present | ○ |

[Test Results]

As seen from the results shown in Table 1, in Comparative Example 2 in which tubes or pipes and metal cross beams were in indirect contact with each other by interposing a support member without using a heat resistant fabric, scratches occurred on the outer surface of the obtained metal tube or pipe due to the contact with the support member. In Comparative Example 1, Inventive Example 1, Inventive Example 2, and Inventive example 3, in which tubes or pipes and metal cross beams were in indirect contact with each other by virtue of a heat resistant fabric interposed in between, no scratch was recognized on the outer surfaces of the obtained metal tubes or pipes. Therefore, it was confirmed that holding a metal tube or pipe and metal cross beams in indirect contact with each other by virtue of a heat resistant fabric interposed in between makes it possible to suppress scratches to be generated on the outer surfaces of metal tubes or pipes.

In Comparative Example 1 in which a heat resistant fabric having a thickness of 1.5 mm was used, discoloration was recognized in the area more than the half of the circumference of metal tube or pipe in the indirect contact portions between the metal cross beams and the metal tubes or pipes. Moreover, in Inventive Example 2 in which a heat resistant fabric having a thickness of 0.6 mm was used, and Inventive Example 3 in which a heat resistant fabric having a thickness of 1.2 mm was used, discoloration was recognized in the area about one-fourth of the circumference of metal tube or pipe in the indirect contact portion between the metal cross beam and the metal tube or pipe, and in Inventive Example 1 in which a heat resistant fabric having a thickness of 0.35 mm was used, no discoloration was recognized on the outer surface of the metal tube or pipe. From these results, it was confirmed that reducing the thickness of the heat resistant fabric enables the reduction of discoloration on the outer surface of the metal tube or pipe.

Regarding Inventive Example 1 in which a heat resistant fabric was used and Comparative Example 2 in which the tubes or pipes were in indirect contact via a support member without using a heat resistant fabric, a microscopic observation was performed on the indirect contact portion of the obtained metal tube or pipe with the heat resistant fabric or the support member. As a result of that, it was confirmed that Inventive Example 1 and Comparative Example 2 each had a similar quality, that is, the properties of the metal tube or pipe were not degraded at the indirect contact surface of obtained metal tube or pipe when the metal tube or pipe and the metal beam were in indirect contact with each other by virtue of a heat resistant fabric interposed in between.

From these results, it has become clear that the method for heat treating metal tubes or pipes for nuclear power plant of the present invention and a batch-type vacuum heat treatment furnace used therefor make it possible to suppress not only scratches but also discoloration to be generated on the outer surface of the metal tube or pipe. Further, it has become clear that the method for heat treating metal tubes or pipes for a nuclear power plant of the present invention makes it possible to obtain a metal tube or pipe that is free of scratches and discoloration attributable to heat treatment.

INDUSTRIAL APPLICABILITY

The method for heat treating a metal tube or pipe for a nuclear power plant of the present invention has the following remarkable effects.

(1) By holding the metal tube or pipe and the metal beam in indirect contact with each other by virtue of a heat resistant fabric interposed in between, it is possible to suppress the formation of scratches on the outer surface of the metal tube or pipe.

(2) By using a heat resistant fabric having a thickness of 0.1 to 1.2 mm, it is possible to reduce the discoloration on the outer surface of the metal tube or pipe.

(3) It is possible to obtain the metal tube or pipe that is free of scratches and discoloration attributable to heat treatment, and in this case, there is no need of polishing the outer surface of the metal tube or pipe by hand work for the removal of scratches and discoloration so that the production efficiency for the metal tube or pipe can be improved.

The batch-type vacuum heat treatment furnace of the present invention makes it possible to easily perform the method for heat treating the metal tube or pipe for the nuclear power plant of the present invention by disposing a heat resistant fabric having a thickness of 0.1 to 1.2 mm on the metal cross beams.

The metal tube or pipe for the nuclear power plant of the present invention is heat treated by using the method for heat treating the metal tube or pipe for the nuclear power plant of the present invention so that the metal tube or pipe is free of scratches and discoloration attributable to the heat treatment, and therefore it exhibits an excellent corrosion resistance.

Thus, the method for heat treating the metal tube or pipe for the nuclear power plant and the batch-type vacuum heat treatment furnace used therefor make it possible to obtain the metal tube or pipe suitable for the heat transfer tube of steam generators in the nuclear power plant, and therefore are useful for the production of the metal tube or pipe for the nuclear power plant.

REFERENCE SIGNS LIST

1. Metal tube or pipe for nuclear power plant
2. Cart
21. Carriage
22. Metal cross beam
23. Support pillar

What is claimed is:

1. A method for heat treating a metal tube or pipe for a nuclear power plant while the metal tube or pipe being accommodated in a batch vacuum heat treatment furnace, wherein when the metal tube or pipe is laid down on and is subjected to heat treatment on a plurality of metal cross beams arranged along a longitudinal direction of the metal tube or pipe, the metal tube or pipe and the metal cross beams are held in indirect contact with each other by virtue of a heat resistant fabric having a thickness of 0.1 to 1.2 mm interposed in between, and the metal tube or pipe is heated in a temperature range of 100° C. to 300° C. for 30 minutes or more.

2. The method for heat treating a metal tube or pipe for a nuclear power plant according to claim 1, wherein the metal tube or pipe for the nuclear power plant has a composition consisting of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

* * * * *